United States Patent
Hamlin

(10) Patent No.: US 7,051,297 B2
(45) Date of Patent: May 23, 2006

(54) METHOD AND APPARATUS FOR MAPPING PLATFORM-BASED DESIGN TO MULTIPLE FOUNDRY PROCESSES

(75) Inventor: Christopher L. Hamlin, Los Gatos, CA (US)

(73) Assignee: LSI Logic Corporation, Milpitas, CA (US)

( * ) Notice: Subject to any disclaimer, the term of this patent is extended or adjusted under 35 U.S.C. 154(b) by 204 days.

(21) Appl. No.: 10/634,634

(22) Filed: Aug. 4, 2003

(65) Prior Publication Data

US 2005/0034088 A1    Feb. 10, 2005

(51) Int. Cl.
    G06F 17/50    (2006.01)
(52) U.S. Cl. .......................................................... 716/3
(58) Field of Classification Search ................. 716/1–6, 716/12–17; 703/14–16, 19–20; 702/117–120
    See application file for complete search history.

(56) References Cited

U.S. PATENT DOCUMENTS

| | | | | |
|---|---|---|---|---|
| 5,500,805 | A * | 3/1996 | Lee et al. .................... | 716/5 |
| 5,563,801 | A * | 10/1996 | Lee et al. .................... | 716/16 |
| 5,754,826 | A * | 5/1998 | Gamal et al. ................ | 703/14 |
| 6,102,961 | A * | 8/2000 | Lee et al. .................... | 716/1 |
| 6,219,819 | B1 * | 4/2001 | Vashi et al. .................. | 716/3 |
| 6,625,788 | B1 * | 9/2003 | Vashi et al. .................. | 716/6 |
| 6,757,882 | B1 * | 6/2004 | Chen et al. .................. | 716/12 |
| 6,871,154 | B1 * | 3/2005 | Byrn et al. .................. | 702/117 |
| 6,966,044 | B1 * | 11/2005 | Reuland et al. .............. | 716/17 |
| 2002/0059054 | A1 * | 5/2002 | Bade et al. .................. | 703/20 |
| 2003/0005401 | A1 * | 1/2003 | Wimer ........................ | 716/11 |
| 2004/0241990 | A1 * | 12/2004 | Schinella .................... | 438/689 |
| 2005/0010378 | A1 * | 1/2005 | Zeidman et al. ............. | 703/1 |
| 2005/0022155 | A1 * | 1/2005 | Broberg et al. ............. | 717/101 |

OTHER PUBLICATIONS

Reliability in CMOS IC Design: Physical Failure Mechanisms and their Modeling.

(Continued)

*Primary Examiner*—Vuthe Siek
*Assistant Examiner*—Naum B. Levin
(74) *Attorney, Agent, or Firm*—Suiter West PC LLO

(57) ABSTRACT

The present invention is directed to a method and apparatus for mapping platform-based design to multiple foundry processes. According to an exemplary aspect of the present invention, a predefined (or pre-specified) slice is successfully mapped on to a first fabrication process with a first set of design rules to produce a first result. Then the slice's ability to be mapped to a second fabrication process with a second set of design rules is evaluated to produce a second result. Next, the comparison between the two results is computed to produce a third result. The third result may be then used to modify the slice architecture, optimize the metalization process and/or modify the first or second fabrication process. The slice definition, the first set of design rules, the second set of design rules, the first result, the second result, and the third result may be stored into a database. With such a database established, new platform-based designs may be mapped to existing foundries, and existing platform-based designs may be mapped to new foundries within a time interval (e.g., hours) much shorter than the 18 months required by typical manual mapping processes.

45 Claims, 2 Drawing Sheets

OTHER PUBLICATIONS

MOSIS Scalable CMOS (SCMOS) Design Rules (Revision 8.0) updated Apr. 25, 2003; http://www.mosis.org/Technical/Designrules/scmos/scmos-main.html; Apr. 30, 2003.

Mosis Scalable CMOS (SCMOS) design rules (Revision 8.0) updated Apr. 25, 2003; http://www.mosis.org/technical/designrules/scmos/scmos-main.html; Apr. 30, 2003. pp. 1-14.

* cited by examiner

METHOD AND APPARATUS FOR MAPPING PLATFORM-BASED DESIGN TO MULTIPLE FOUNDRY PROCESSES

FIELD OF THE INVENTION

This invention relates generally to integrated circuits, and particularly to a method and apparatus for mapping platform-based design to multiple foundry processes.

BACKGROUND OF THE INVENTION

Foundry mapping is a process of mapping an IC (integrated circuit) design onto a fabrication process used in a foundry. Different foundries conventionally have different fabrication processes and design rules. Being able to readily map an IC definition onto different fabrication processes is a long sought-after goal in the IC industry. However, this goal tended to be very difficult in standard cell architecture because the emphasis has been on extracting the maximum possible performance out of any particular process. For example, the actual libraries that define the cell characteristics are often pressing the corner cases of the process, and only when a device specified does not work (because timing is not met or because there is leakage or for some other reasons) does the IC designer back off slightly until the IC designer squeezes the IC design into the product parameters well enough to work. Because the problem of readily mapping an IC definition onto different fabrication processes was insufficiently constrained (too many variables) in standard cell architecture, the problem proved to be intractable computationally.

MOSIS (Metal-Oxide Semiconductor Implementation Service) takes a very high-level abstract specification of an IC, circuit characteristics and parameters, and maps the IC onto any of several existing processes. For example, MOSIS may map an IC to any of a number of foundry processes. Indeed, MOSIS may even allow an IC to be mapped to foundry processes of different generations including a 0.25 micrometer process, a 0.18 micrometer process, a 0.13 micrometer process, and the like.

The reason that MOSIS renders the problem of readily mapping an IC definition onto different fabrication processes computationally tractable is that MOSIS detunes the performance and density characteristics of the mapping, which is achieved so strongly that the mapping has no real commercial interest. Thus, because MOSIS operates at such a high level of abstraction, MOSIS does not perform anywhere close to approaching the kind of performance optimality or packing density optimality required in a commercial process. In other words, MOSIS mapping is mostly used for academic citing, not for commercially viable products.

Thus, it would be desirable to provide a method and apparatus for readily mapping commercially viable IC design (e.g., platform-based design) to multiple foundry processes.

SUMMARY OF THE INVENTION

Accordingly, the present invention is directed to a method and apparatus for mapping platform-based design to multiple foundry processes. According to an exemplary aspect of the present invention, a predefined (or pre-specified) slice is successfully mapped on to a first fabrication process with a first set of design rules to produce a first result. Then the slice's ability to be mapped to a second fabrication process with a second set of design rules is evaluated to produce a second result. Next, the comparison between the two results is computed to produce a third result. The third result may be then used to modify the slice architecture, optimize the metalization process and/or modify the first or second fabrication process. The slice definition, the first set of design rules, the second set of design rules, the first result, the second result, and the third result may be stored into a database. With such a database established, new platform-based designs may be mapped to existing foundries, and existing platform-based designs may be mapped to new foundries within a time interval (e.g., hours) much shorter than the 18 months required by typical manual mapping processes.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
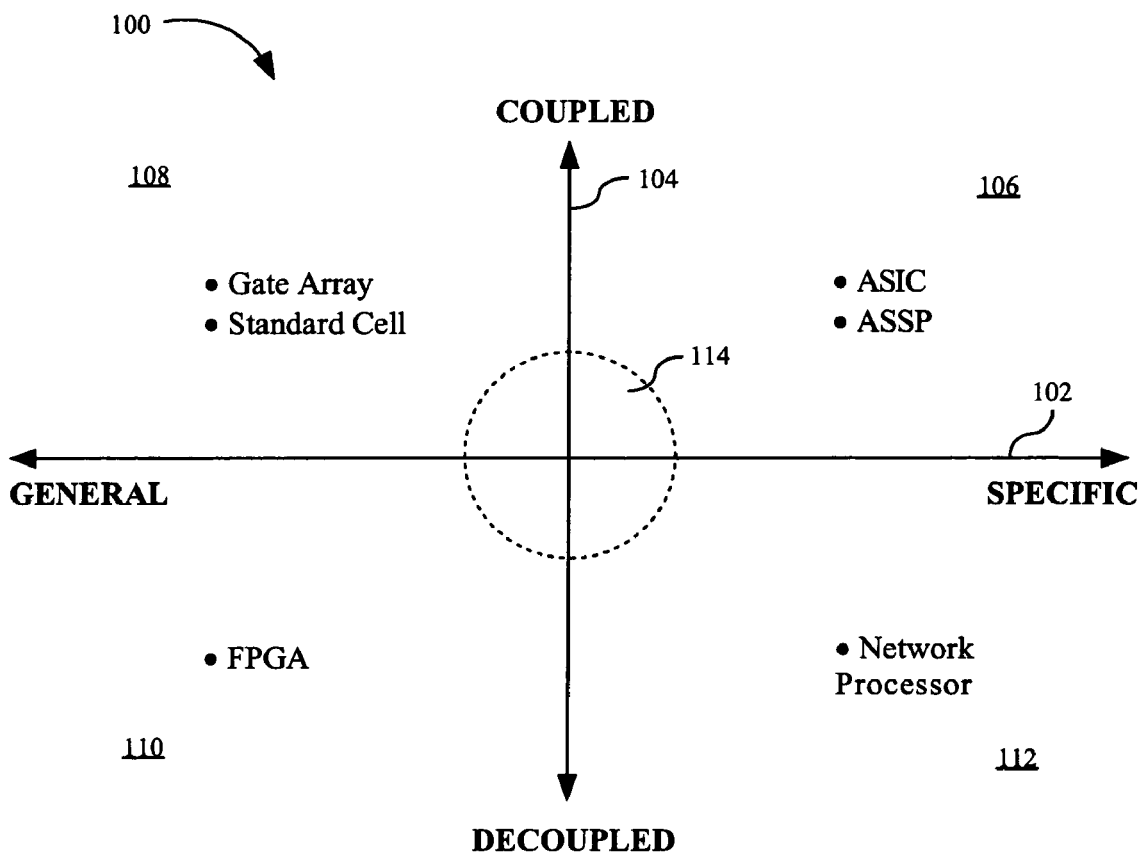
FIG. 1 is a schematic diagram illustrating an exemplary two-dimension space in which a semiconductor device may be positioned.

FIG. 1 is a schematic diagram illustrating a two-dimension space 100 in which a semiconductor device may be positioned. The space 100 may include a horizontal axis 102, a vertical axis 104, and four quadrants 106, 108, 110 and 112. Using the horizontal axis 102, a distinction may be made between a semiconductor device which is general in its organization and another semiconductor device which is specific in its organization. Using the vertical axis 104, a distinction may be made between a semiconductor device whose final functionality is coupled to a manufacturing process and another semiconductor device whose final functionality is decoupled to (i.e., independent of) a manufacturing process.

An FPGA (field programmable gate array) is an example of a decoupled device that is very general in nature. An FPGA is manufactured in high volumes in a factory without any consideration at all of its ultimate actual functional purpose. Thus, the manufacturing and the functionality are completely independent of each other, i.e., completely decoupled. An FPGA may be positioned in the quadrant 110.

On the other extreme, an ASIC (application specific integrated circuit) or an ASSP (application specific standard product) is an example of a coupled device that is very specific in nature. An ASIC or an ASSP is completely coupled because the device does not have existence until the actual design that the ultimate customer intends for the device to have is imposed on the device, which is accomplished in the factory. An ASIC or an ASSP is also very specific with respect to the functionality. An ASIC or an ASSP may be positioned in the quadrant 106.

Gate array or a standard cell organization in various forms is very general in its characteristics and also very tightly coupled, and may be positioned in the quadrant 108. A network processor is very specific but fully decoupled and may be positioned in the quadrant 112.

A platform may be positioned within a center area 114 of the space 100. A platform is a large-scale, high-complexity semiconductor device that includes one or more of the following elements: (1) memory; (2) a customizable array of transistors; (3) a IP (intellectual property) block; (4) a processor, e.g., an ESP (embedded standard product); (5) an embedded programmable logic block; and (6) interconnect. RapidChip™ developed by LSI Logic Corp. is an instance of a platform.

Platform-based IC (integrated circuit) design is a powerful concept for coping with the increased pressure on time-to-market, design and manufacturing costs. The basic idea behind the platform-based design is to avoid designing a chip from scratch. Some portion of the chip's architecture is predefined for a specific type of application. Through extensive design reuse, the platform-based design may provide faster time-to-market and reduce design cost.

Under a platform approach, there are two distinct steps entailed in creating a final end-user product: a prefabrication step and a customization step. In a prefabrication step, a slice is built on a wafer. A slice is a pre-manufactured chip in which all silicon layers have been built, leaving the top metal layers to be completed with the customer's unique IP. For example, RapidSlice™ developed by LSI Logic Corp. is an instance of a slice. One or more slices may be built on a single wafer. It is understood that a slice may include one or more bottom metal layers or may include no metal layers at all. In a preferred embodiment of the prefabrication step, the diffusion processes and the early-metal steps are carried out in a wafer fab. That is, the base characteristics, in terms of the IP, the processors, the memory, the interconnect, the programmable logic and the customizable transistor array, are all laid down and prediffused, and the early-metal components of the stack are manufactured. However, a slice is still fully decoupled because the customer has not yet introduced the function into the slice. In a customization step, metal layers (or late-metal components) are laid down, which wire up the elements that make up the slice built in the wafer fab early on, and the customizable transistor array is configured and given its characteristic function.

It is understood that a prefabrication step and a customization step may be performed in different foundries. For example, a slice may be manufactured in one foundry. Later, in a customization step, the slice may be pulled from inventory and metalized, which gives the slice a final product characteristics in a different foundry.

Figure 2:
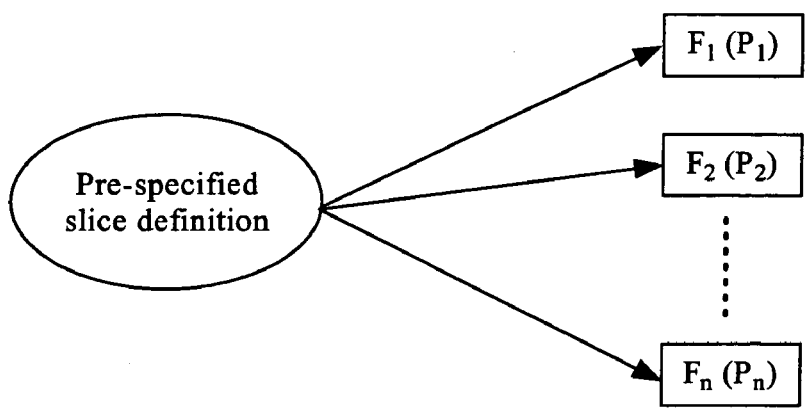
FIG. 2 is a schematic diagram illustrating a pre-specified slice definition may be readily mapped in different foundries which run different fabrication processes.

Given the foregoing-described slice definition, from a commercial point of view, it is very important to be able to assure multiple sources of supply for a slice. Referring to FIG. 2, there may be multiple different foundries $F_1, F_2, \ldots, F_n$, which run fabrication processes $P_1, P_2, \ldots, P_n$, respectively. It is desirable to take a pre-specified slice definition (which is a logical and functional specification of all of the operational characteristics of the slice, including the IP that makes it up, the interconnect, the behavior of the interconnect, the memory cell, the timing, all of the verification details that apply to the slice itself, and the like) and be able to swing it readily among these different foundries $F_1, F_2, \ldots, F_n$.

A slice is a constrained specification. A slice is an abstract specification of all IP, characteristics of interconnect, memory structures, I/O's, a transistor array, embedded programmable logic (if there is any), and the like. All these elements are pre-specified before any functional exploitation of the resources on the slice is commenced. The fact that a slice is a constrained environment suggests that the problem of readily mapping a pre-specified slice definition onto different fabrication processes may be computationally tractable. That is, it may be possible to take the slice definition, irrespective of what the slice ultimately will be used for in a final product, and apply the slice definition to any of several alternative fabrication processes, possibly from alternative foundries (the sources of supply for the slice).

Figure 3:
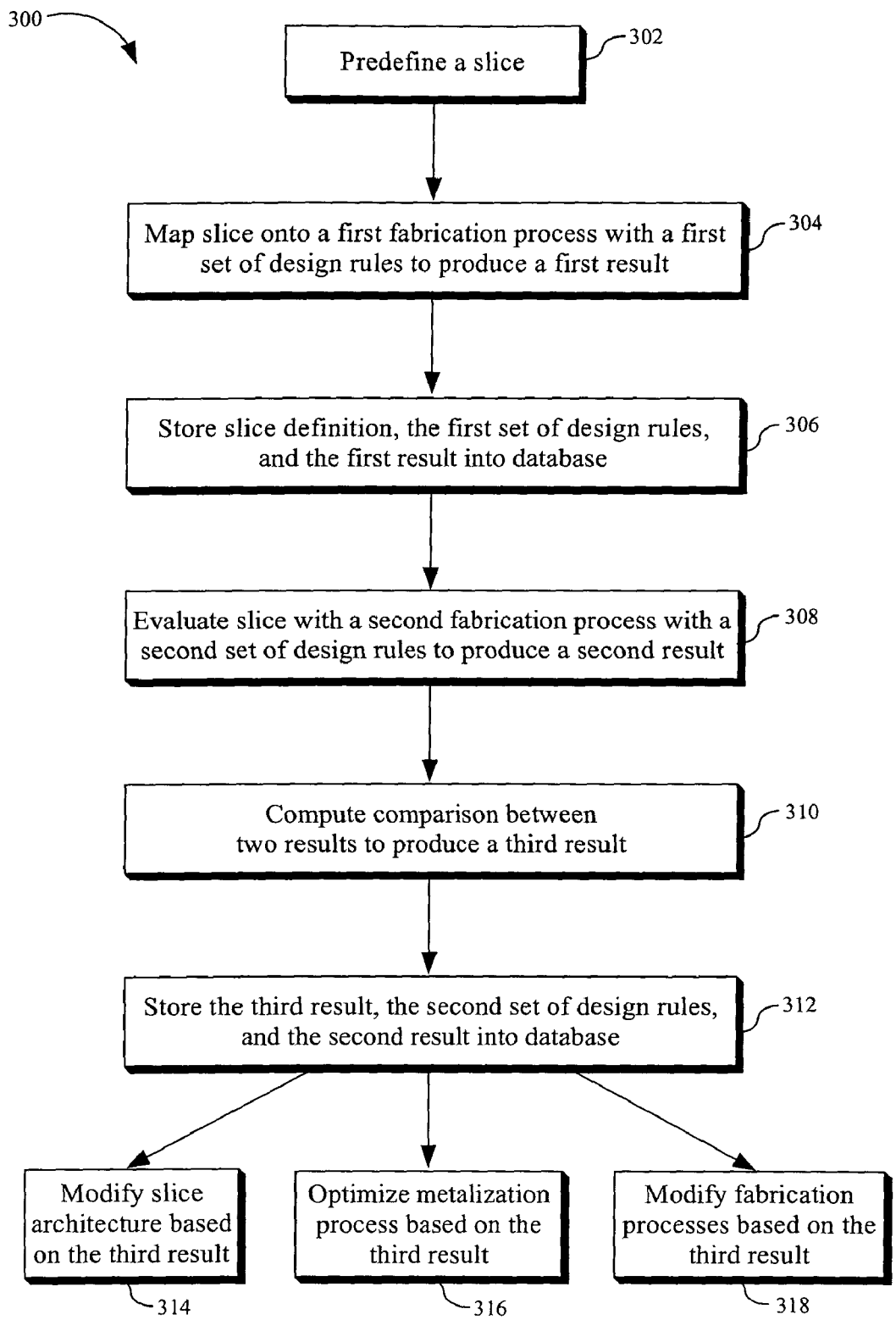
FIG. 3 is a flow diagram showing an exemplary process for readily mapping a slice definition onto multiple fabrication processes.

FIG. 3 is a flow diagram showing an exemplary process 300 for readily mapping a slice definition onto multiple fabrication processes. The process 300 starts with step 302 in which a slice may be predefined (or prespecified). In other words, a definition (or specification) may be provided for a slice. Then in step 304, the pre-defined slice is mapped onto a first fabrication process with a first set of design rules to produce a first result. In a preferred embodiment, the pre-defined slice is successfully verified within the context of the first set of design rules of the first fabrication process. In other words, the mapping to the first fabrication process is successful.

Next, in step 306, the definition of the predefined slice, the first set of design rules, and the first result may be stored into a database. That is, the limit condition or the boundaries for the slice mapping or implementation may be analyzed, and all of the operational characteristics (including the jitter, the timing, the logical characteristics, the latency, the tolerable latency, the power characteristics, the analog property, leakage, IR drop, and the like) may be stored into a database. In other words, all fundamental entities that describe whether or not the predefined slice is correctly implemented within the boundary of the first fabrication process are abstracted and recorded parametrically in a database. It is understood that the step 306 may be alternatively not included in the process 300 without departing from the scope and spirit of the present invention.

Next, in step 308, the pre-defined slice may be mapped onto a second (target) fabrication process with a second set of design rules to produce a second result. That is, the pre-defined slice, which has been successfully verified within the first set of design rules and successfully mapped, is evaluated with respect to the slice's ability to be implemented in a second fabrication process with a second set of design rules. In a preferred embodiment, the second fabrication process is fairly close to the first fabrication process, e.g., they both use 0.13-micron technology, they both use 0.18-micron technology, or the like.

Then, in step 310, a comparison between the first and second results may be computed to produce a third result. According to one aspect of the present invention, computation of comparison may be accomplished with a hybrid analysis, wherein evaluation of an element of the slice is discontinued when the element is established to be accessible in the second fabrication process. It is understood that from the standpoint of a system implementing the comparison, if one were to analyze every single transistor in every single library cell in every single element making up a slice, the problem is intractable from a computational point of view. In other words, it would take such enormous amount of time to compute the comparison that one might just as well perform conventional mapping, which is manual and typically takes 18 to 24 months to complete.

However, a predefined slice is a constrained environment, i.e., a predefined slice must conform very rigidly to the requirements of the process that the slice being mapped onto. Thus, it is not necessary to carry out a full, in-depth analysis of every single operational characteristic. In fact, the great bulk of logical function that are encapsulated in the libraries, the cell structures, the interconnect definitions, the elements of the slice, and the like may be certified valid for comparison purposes in the second fabrication process, without descending all the way to the deepest level of analog analysis, e.g., the SPICE (simulation program with integrated circuits emphasis) analysis and the like.

According to an exemplary aspect of the present invention, the step 310 may be a tree-structured analysis, in which only a small number of the analytical steps may be needed to descend, for example, to the deepest level of SPICE as the analysis proceeds, i.e., as the effectiveness of the second fabrication process is established for particular classes of element. It is understood that this doesn't just mean elements in isolation, but it is a combinatorial problem. It means taking elements in relation to other step developments. However, as this tree of device effectiveness is built up, that, too, is stored in the database so that the database accumulates intermediate analytical results, which may be used to guide subsequent steps in the assessment of the conformance of the second fabrication process to support the predefined slice.

It is understood that the step 310 may be an extremely computationally intense activity. According to one aspect of the present invention, one may exploit the price performance characteristics of inexpensive hardware and software to come on the market in the last two or three years, particularly Intel and Linux-type systems, to build up network-distributed processing systems, which may possess enormous computational power to solve this computation problem for far less money than was true even five years ago.

Next, in step 312, the comparison results and the second set of design rules may be stored into the database. In a preferred embodiment, the steps 310 and 312 are a joint combination of the infrastructure analysis to get the maximal advantage out of price performance that the market offers today (as opposed to spending millions and millions of dollars on a super computer, which is how one would have done it 5 or 10 years ago), the structure of the database (which preferably records both the input parameters of the problem and accumulates the intermediate results as the analysis progresses forward), and the hybrid analysis (i.e., one discontinues evaluation of a particular design element once one has established that the element, as fused in the slice, is accessible in the second fabrication process). In a preferred embodiment, the database may include a first field containing data representing the slice definition, a second field containing data representing the first set of design rules, a third field containing data representing the second set of design rules, a fourth field containing data representing the computed comparison result (including intermediate and preliminary results), and so on. According to one aspect of the present invention, the computed comparison result (the third result) may contain some variables that are invariant in platform-based design, which may be used to predict the mapping to a new foundry. With such a database established, new platform-based designs may be mapped to existing foundries, and existing platform-based designs may be mapped to new foundries within a time interval (e.g., hours) much shorter than the 18 months that typical manual mapping takes. Even better, one may reconstruct a new mapping for a new foundry or product, based on heuristics learned from prior mappings between prior platform-based designs and existing foundries. This is useful when moving from one foundry to another using the same platform-based design.

Once the ratification of the second fabrication process has been achieved, or once preliminary results (e.g., the third result) obtained from a comparison of the two processes for the slice have been stored into the database, these preliminary results may then be applied in a number of different ways. In one embodiment of the present invention, as shown in step 314, these preliminary results may be fed back into the definition of the slice itself so that the architecture of the slice is modified to make it fit better within the space of the two sets of design rules that have now been incorporated into the database.

In a further embodiment of the present invention, as shown in step 316, these preliminary results may carry implications for how the metalization (or later-metal process) is optimally accomplished. In other words, these preliminary results may have an impact on the process steps that apply to the metalization (or late-metal definition). This is very important because increasingly in the future the metal (or late-metal) steps may be the critical steps in determining the efficiency, the profitability and the cost effectiveness of the entire platform (e.g., RapidChip™) oriented process.

In another embodiment of the present invention, as shown in step 318, these preliminary results may apply to the fabrication process itself (e.g., the diffusion processes in the wafer fab). Initially, one may accept the design rules that the foundry provides without making any attempt to modifying them. However, as one gains more and more experience with this process of foundry targeting and foundry mapping, it is clear that one may derive a huge database on the effectiveness of particular process properties and process characteristics for the implementation of particular slices. The preliminary results may then be fed back into the definition of the fabrication process itself. As one gains volume and clout in the marketplace with the platform approach, one's ability to influence foundries may be enhanced by this ability to apply what one has learned to their processes. Just like FPGAs that represent a very high proportion of the foundry volume today and are thus able to influence process definition within the foundries, the platform-based design may have the same effect, which is very important in enhancing value and in increasing profitability.

Thus, the preliminary results of the comparison may be fed back into the slice definition itself, into the metalization (or late-metal) steps, and/or into the wafer fab processes (e.g., the diffusion processes).

It is understood that the process 300 is exemplary only. Those of ordinary skill in the art will appreciate that other embodiments may be used without departing from the scope and spirit of the present invention. For example, the steps 306 and 312 shown in FIG. 3 may be merged into a single step in which the slice definition, the first set of design rules, the second set of design rules, the first mapping result, the second mapping result, and/or the comparison result are stored into a database. Alternatively, the process 300 may include neither the step 306 nor the step 312.

According to a further aspect of the present invention, the manufacturing infrastructure, which is implied by this whole system of analysis and attempt to take slices (abstract slices that do not have any function in and of themselves) and evaluate them in the light of different fabrication processes and so on, may have an impact on platform architecture itself. After repeating the process 300 shown in FIG. 3 to many different slices, one may gain insight on the entire architecture of how to organize a platform. For example, one may learn the answer to the following operation and research question: how best should one organize the resources that are distributed on a particular platform, both spatially and temporally? The analysis derived from the computed comparison and the process of fitting slices and fabrication processes together may result in an understanding of the limits to temporal optimization that seem to be imposed on these platform devices, which particularly takes the form of the temporal structure of the interconnect (hierarchical or not hierarchical).

According to one aspect of the present invention, both the spatial structure and the temporal structure of the organization of platforms may be best understood or optimized in terms of broken symmetry, which is a general property of systems and structures in nature that is widely and deeply studied in evolutionary theory and so on. The preliminary results obtained from studying how to target different foundries and different processes with our individual slices may be applied to the definition of platform itself and may allow one to effectively apply broken symmetry to both the temporal and the spatial structures that one may incorporate in future platform architectures.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of software package. Such a software package may be a computer program product which employs a storage medium including stored computer code which is used to program a computer to perform the disclosed function and process of the present invention. The storage medium may include, but is not limited to, any type of conventional floppy disks, optical disks, CD-ROMS, magneto-optical disks, ROMs, RAMs, EPROMs, EEPROMs, magnetic or optical cards, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for mapping platform-based design to multiple foundry processes, comprising:
    (a) predefining a slice, said slice being a constrained and abstract specification of all IP, characteristics of interconnect, memory structures, I/O's, and a transistor array of a chip;
    (b) mapping said slice onto a first fabrication process with a first set of design rules to produce a first result;
    (c) evaluating said slice with a second fabrication process with a second set of design rules to produce a second result; and
    (d) comparing said first result and said second result to produce a third result.

2. The method of claim 1, wherein said slice is a Rapid-Slice™.

3. The method of claim 1, wherein said step (d) is a hybrid analysis whereby evaluation of an element of said slice is discontinued when said element is established to be accessible in said second fabrication process.

4. The method of claim 1, wherein said step (d) is accomplished with a network-distributed processing system.

5. The method of claim 1, wherein said third result including at least one variable that is invariant in said platform-based design.

6. The method of claim 1, further comprising modifying said slice definition based on said third result.

7. The method of claim 1, further comprising optimizing a metalization process giving a final function of said slice based on said third result.

8. The method of claim 1, further comprising modifying said first fabrication process based on said third result.

9. The method of claim 1, further comprising modifying said second fabrication process based on said third result.

10. The method of claim 1, further comprising storing said third result into a database.

11. The method of claim 1, further comprising optimizing platform architecture used to predefine said slice based on said third result.

12. The method of claim 11, further comprising optimizing temporal structure of interconnect of said platform architecture based on said third result.

13. An apparatus for mapping platform-based design to multiple foundry processes, comprising:
    (a) means for predefining a slice, said slice being a constrained and abstract specification of all IP, characteristics of interconnect, memory structures, I/O's, and a transistor array of a chip;
    (b) means for mapping said slice onto a first fabrication process with a first set of design rules to produce a first result;
    (c) means for evaluating said slice with a second fabrication process with a second set of design rules to produce a second result; and
    (d) means for comparing said first result and said second result to produce a third result.

14. The apparatus of claim 13, wherein said slice is a RapidSlice™.

15. The apparatus of claim 13, wherein said means (d) performs a hybrid analysis whereby evaluation of an element of said slice is discontinued when said element is established to be accessible in said second fabrication process.

16. The apparatus of claim 13, wherein said means (d) comprises a network-distributed processing system.

17. The apparatus of claim 13, wherein said third result including at least one variable that is invariant in said platform-based design.

18. The apparatus of claim 13, further comprising means for modifying said slice definition based on said third result.

19. The apparatus of claim 13, further comprising means for optimizing a metalization process giving a final function of said slice based on said third result.

20. The apparatus of claim 13, further comprising means for modifying said first fabrication process based on said third result.

21. The apparatus of claim 13, further comprising means for modifying said second fabrication process based on said third result.

22. The apparatus of claim 13, further comprising means for storing said third result into a database.

23. The apparatus of claim 13, further comprising means for optimizing platform architecture used to predefine said slice based on said third result.

24. The apparatus of claim 23, further comprising means for optimizing temporal structure of interconnect of said platform architecture based on said third result.

25. A computer-readable medium having computer-executable instructions for performing a method for mapping platform-based design to multiple foundry processes, said method comprising steps of:
  (a) predefining a slice, said slice being a constrained and abstract specification of all IP, characteristics of interconnect, memory structures, I/O's, and a transistor array of a chip;
  (b) mapping said slice onto a first fabrication process with a first set of design rules to produce a first result;
  (c) evaluating said slice with a second fabrication process with a second set of design rules to produce a second result; and
  (d) comparing said first result and said second result to produce a third result.

26. The computer-readable medium of claim 25, wherein said slice is a RapidSlice™.

27. The computer-readable medium of claim 25, wherein said step (d) is a hybrid analysis whereby evaluation of an element of said slice is discontinued when said element is established to be accessible in said second fabrication process.

28. The computer-readable medium of claim 25, wherein said step (d) is accomplished with a network-distributed processing system.

29. The computer-readable medium of claim 25, wherein said third result including at least one variable that is invariant in said platform-based design.

30. The computer-readable medium of claim 25, wherein said method further comprising modifying said slice definition based on said third result.

31. The computer-readable medium of claim 25, wherein said method further comprising optimizing a metalization process giving a final function of said slice based on said third result.

32. The computer-readable medium of claim 25, wherein said method further comprising modifying said first fabrication process based on said third result.

33. The computer-readable medium of claim 25, wherein said method further comprising modifying said second fabrication process based on said third result.

34. The computer-readable medium of claim 25, wherein said method further comprising storing said third result into a database.

35. The computer-readable medium of claim 25, wherein said method further comprising optimizing platform architecture used to predefine said slice based on said third result.

36. The computer-readable medium of claim 35, wherein said method further comprising optimizing temporal structure of interconnect of said platform architecture based on said third result.

37. A computer-readable medium having stored thereon a database having a data structure, said data structure comprising:
  (a) a first field containing data representing a slice definition, said slice definition being a constrained and abstract specification of all IP, characteristics of interconnect, memory structures, I/O's, and a transistor array of a chip;
  (b) a second filed containing data representing a first set of design rules with which said slice definition is mapped to a first fabrication process;
  (c) a third field containing data representing a second set of design rules with which said slice definition is mapped to a second fabrication process; and
  (d) a fourth field containing data representing a result of computed comparison between results of said two mappings.

38. The computer-readable medium of claim 37, wherein said slice is a RapidSlice™.

39. The computer-readable medium of claim 37, wherein said result of computed comparison includes at least one variable that is invariant in platform-based design used to provide said slice definition.

40. The computer-readable medium of claim 37, wherein said database is used to modify said slice definition.

41. The computer-readable medium of claim 37, wherein said database is used to optimiz a metalization process giving a final function of said slice definition.

42. The computer-readable medium of claim 37, wherein said database is used to modify said first fabrication process.

43. The computer-readable medium of claim 37, wherein said database is used to modify said second fabrication process.

44. The computer-readable medium of claim 37, wherein said database is used to optimize platform architecture used to provide said slice definition.

45. The computer-readable medium of claim 44, wherein said database is used to optimize temporal structure of interconnect of said platform architecture.

* * * * *